(12) United States Patent
Iyer et al.

(10) Patent No.: US 7,317,994 B2
(45) Date of Patent: Jan. 8, 2008

(54) METHOD AND APPARATUS FOR SIGNAL SIGNATURE ANALYSIS FOR EVENT DETECTION IN ROTATING MACHINERY

(75) Inventors: Naresh Sundaram Iyer, Clifton Park, NY (US); John Erik Hershey, Ballston Lake, NY (US); James Kenneth Aragones, Clifton Park, NY (US); Kai Frank Goebel, Ballston Lake, NY (US); Weizhong Yan, Clifton Park, NY (US); Piero Patrone Bonissone, Schenectady, NY (US); Charles Terrance Hatch, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 11/200,156

(22) Filed: Aug. 10, 2005

(65) Prior Publication Data
US 2007/0038392 A1    Feb. 15, 2007

(51) Int. Cl.
*G01H 9/00*    (2006.01)
(52) U.S. Cl. ............... 702/56; 702/183; 702/185; 702/190; 340/680; 73/579; 73/659; 73/660

(58) Field of Classification Search ............. 702/56, 702/190, 183, 185; 73/579, 593, 660, 659, 73/668, 651, 462, 463; 340/680
See application file for complete search history.

(56) References Cited

U.S. PATENT DOCUMENTS

| | | | | |
|---|---|---|---|---|
| 3,693,402 A | * | 9/1972 | Jones | 73/11.05 |
| 4,352,293 A | * | 10/1982 | Kurihara et al. | 73/593 |
| 5,001,933 A | * | 3/1991 | Brand | 73/651 |
| 5,278,512 A | * | 1/1994 | Goldstein | 324/509 |
| 5,602,761 A | * | 2/1997 | Spoerre et al. | 702/179 |
| 5,717,141 A | * | 2/1998 | Kikuchi et al. | 73/579 |
| 5,974,882 A | * | 11/1999 | Heath | 73/579 |
| 5,992,234 A | * | 11/1999 | Rhodes et al. | 73/579 |
| 6,092,029 A | * | 7/2000 | Bently | 702/56 |
| 6,208,949 B1 | * | 3/2001 | Eatwell | 702/189 |
| 6,289,735 B1 | * | 9/2001 | Dister et al. | 73/579 |
| 6,868,348 B1 | * | 3/2005 | Stoutenburg et al. | 702/56 |
| 2005/0155429 A1 | * | 7/2005 | Griessler et al. | 73/593 |

* cited by examiner

Primary Examiner—Carol S. W. Tsai
(74) Attorney, Agent, or Firm—Nixon & Vanderhye P.C.

(57) ABSTRACT

A method for analyzing vibration including: acquiring a vibration signal; isolating a vibration signal event in the acquired signal; determining a frequency of a damped sinusoid of the vibration signal event, wherein the damped sinusoid characterizes the vibration signal event, and using the characteristic damped sinusoid to identify an occurrence of the vibration signal event in another vibration signal.

21 Claims, 7 Drawing Sheets

Fig. 3

Exponential function fitting

$$\underset{\alpha,\beta}{\operatorname{argmin}}\left(\frac{1}{n}\cdot\sum_{i=1}^{n}|f_i-\hat{f}_i|^2\right)$$

$\{f_i, t_i\}$  $i = 1,2,\ldots n$   The envelope of the signal $\{\hat{f}_i, t_i\}$  $i = 1,2,\ldots n$   The estimated envelope $\hat{f}_i = \alpha \cdot e^{-\beta \cdot t_i}$   The exponential function to be fitted $\beta$

Decayed sinusoidal function fitting

$$\underset{\varpi_n}{\operatorname{argmax}}\,(corr\,(s,\hat{s}))$$

$\{s_i, t_i\}$  $i = 1,2,\ldots n$   The signal measurement $\{\hat{s}_i, t_i\}$  $i = 1,2,\ldots n$   The estimated decayed sinusoidal signal $\hat{s}_i = A_0 \cdot e^{-\varpi_n \cdot \zeta \cdot t_i} \cdot \left[\dfrac{\varpi_n \cdot \zeta}{\varpi_d}\sin(\varpi_d \cdot t_i) + \cos(\varpi_d \cdot t_i)\right]$  The sinusoidal function where   $\varpi_d = \varpi_n \cdot \sqrt{1-\zeta^2}$   $\zeta = \dfrac{\beta}{\varpi_n}$ $\varpi_n$  $\zeta$

METHOD AND APPARATUS FOR SIGNAL SIGNATURE ANALYSIS FOR EVENT DETECTION IN ROTATING MACHINERY

BACKGROUND OF THE INVENTION

The present invention relates to signal signature analysis for rotating machinery.

The continuous (or at least frequent) monitoring, detection and analysis of machine vibration can be helpful in maintaining rotating machinery, such as production-line critical devices. Certain vibrations in machinery are indicative of the operating condition of the machine and may be used to monitor the machine, such as to determine when maintenance is needed. Vibration signal processing techniques have been implemented that identify certain vibration events and distinguish other machinery vibrations in the harsh signal environment common to rotating machines.

A conventional approach to identifying vibration signal events are noise-cleaning techniques. These techniques filter out spectral vibrational regimes that carry nominal or no information regarding the vibration data of interest e.g., vibration data of abnormal machine operation. Noise-cleaning techniques typically identify vibration signal signatures that are of interest and/or that indicate a potential machine problem or operating condition. The vibration signal signatures are identified using signal templates that are specific to a particular vibration signal signature and filter out other vibrations. The signal templates are typically exemplary excerpts of vibration signals of interest. Signal templates are used to identify vibration signal events that are similar to the vibration signal defined by the template.

A difficulty with signal templates is that they are specific to a single machine or machine model. The signal signature(s) for each rotating machine tends to exhibit some difference(s) with respect to the signal signatures of other rotating machines. To create the filtering templates for noise-cleaning, the templates are typically uniquely designed for each machine. The development of templates may involve extensive vibration analysis to properly dichotomize the vibration data into an information-bearing regime and a noise regime. There is therefore a long-felt need for improved techniques for vibration signal analysis that overcome the significant problems in existing noise-filtering techniques.

BRIEF DESCRIPTION OF THE INVENTION

A method has been developed for analyzing vibration including: acquiring a vibration signal; isolating a vibration signal event in the acquired signal; determining a natural frequency of the vibration signal event, using a damped sinusoid corresponding to the natural frequency to characterize the vibration signal event, and using the characteristic damped sinusoid to identify an occurrence of the vibration signal event in another vibration signal.

The method may include extracting a natural frequency of the vibration signal event using a short-term Fourier Transform and determining a damping factor for the characteristic damped sinusoid by fitting an exponential function to the vibration signal event. The fitting of the exponential function may further comprise comparing exponential functions having various decay factors to a signal envelope of the vibration signal event and selecting the one of the decay factors having the smallest sum of squared differences between values of the exponential function at each of several decay factors and corresponding values of the signal envelope. In addition, applying the sinusoid may further include detecting a shift in a time of the occurrence of the vibration signal event, and using the wavelet analysis wherein the characteristic damped sinusoid is a mother wavelet.

The method may model a vibration event comprising the steps of: acquiring a vibration signal generated by a rotating machine; isolating a vibration signal event in the acquired signal; determining a natural frequency of the vibration signal event using a short-term Fourier Transform, using a damped sinusoid corresponding to the natural frequency to characterize the vibration signal event, and using the characteristic damped sinusoid to identify an occurrence of the vibration signal event in another vibration signal.

Further a system has been developed for monitoring a rotating machine comprising: a vibration sensor coupled to the machine and generating a vibration signal indicative of vibration in the machine; a physics based signal analyzer (PBSA) further comprising a signal conditioning and analysis unit and a display and control unit, wherein the signal conditioning and analysis unit generates a characteristic damped sinusoid applied to the vibration signal and identifies vibration events in the vibration signal corresponding to the sinusoid, and wherein the display and control unit generates a display image showing the identified vibration events. Further a shaft encoder may be used for generating a rotational signal indicative of a rotational position of a rotating shaft in the machine and wherein said PBSA correlates the rotational signal and the identified vibration events and displays the correlation between the vibration events and shaft angular position on the display image. In addition, a control input to the display and control unit may be used to receive user inputs identifying a signature vibration event to be modeled by the characteristic decayed sinusoid.

BRIEF DESCRIPTION OF THE DRAWINGS

FIG. 3 is a detailed flow chart of the exponential function fitting and damped sinusoid function fitting steps of the flow chart shown in FIG. 2.

DETAILED DESCRIPTION OF THE INVENTION

Figure 1:
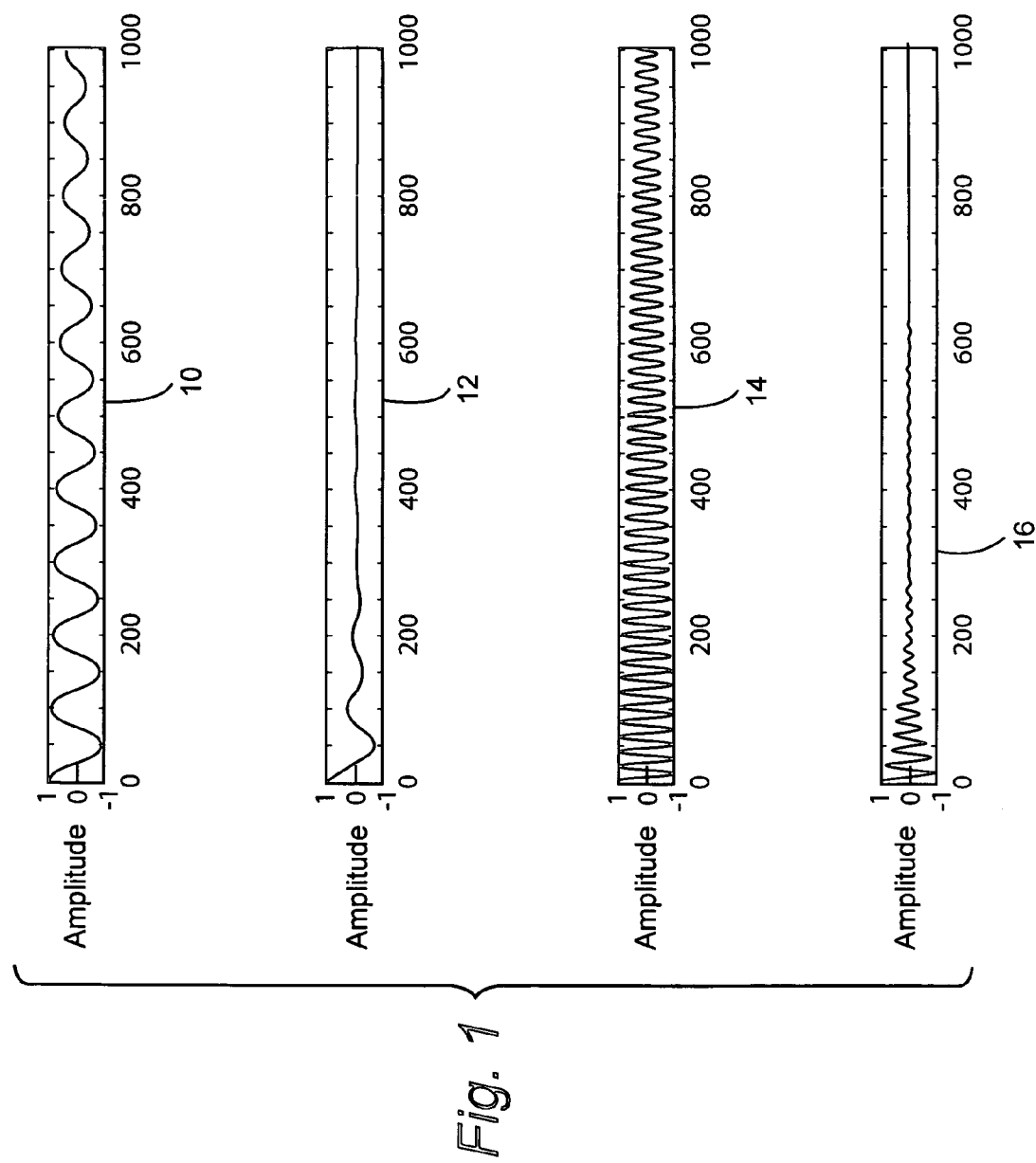
FIG. 1 is a series of charts showing sinusoids having different degrees of damping.

A method and system has been developed for analytically characterizing a vibration signature of interest, subsequently monitoring the vibration data for the signature of interest, and reporting the epochs of the signature of interest's occurrence. The signal analysis is based upon signal structures of interest that are expected to be present by virtue of the physics of operation of the mechanical componentry under monitoring.

In one example, the method and system analytically characterizes events occurring during machine rotation by means of vibration signatures where each event of interest is characterized by a vibration signature that is specific to the event of interest, subsequently monitors the vibration data for the presence of those signatures and/or for variations of the signatures, and reports the occurrences of the corresponding events or a variation in their occurrence pattern. The signal signature analysis may be based on signal structures of interest that are expected to be present by virtue of the physics of operation of the mechanical componentry under monitoring.

Each event of interest is characterized by a vibration signature which, is modeled as a damped sinusoid. The damped sinusoid is then compared to a subsequently monitored vibration signal to identify the occurrence of the corresponding event in that signal. When a segment in the vibration signal matches a damped sinusoid, it is determined that the event corresponding to that signature has occurred. Furthermore, matching with the damped sinusoid may be used to determine the time at which the event occurred within the device rotation. Using this ability, the absence of an expected vibration event, or a shift in its relative time with respect to the device rotation, may be used to infer a potential deviation in the physics of the device operation, and therefore the presence of a potential malfunction.

Mechanical vibrations in large rotating machinery may be reliably characterized as damped sinusoids. Mechanical vibrations are typically caused by impulses such as knocks, jars, and strikes within a machine that occur due to physics of operation of the device. When hit by impulses, the plates, shells and other components of machines tend to "ring", such that they vibrate in a fast periodic deformation behavior. This oscillatory behavior decays, i.e., is damped.

A damped sinusoid is used to model the waveform of an impulse induced vibration event. The damped sinusoid model may be applied to track impulses that occur regularly during the device rotation and therefore to detect any changes in the vibrational characteristics of the device.

Damped sinusoids are excellent candidates for representing or approximating many physical vibrations resulting from a short duration excitation. The general family of damped sinusoids can compose an orthogonal basis for signal representation as demonstrated by Sohie and Maracas in their paper "Orthogonality of Exponential Transients," Proceedings of the IEEE, Vol. 76, No. 12, 1988, pp. 1616-1618.

A suitable definition of a sinusoid function is any function of time having the following form:

$$x(t) = A \sin(\omega t + \Phi)$$

where all variables are real numbers, and
A=peak amplitude (nonnegative)
$\omega$=radian frequency (rad/sec.)
$\omega = 2\pi f$ (f in Hertz)
t=time(sec.)
f=frequency (Hz)
$\Phi$=initial phase (radians)
$\omega t + \Phi$=instantaneous phase (radians)

A damped sinusoid function may be represented as a sinusoid multiplied by the term $e^{-kt}$ where k is the damping factor and is greater than zero. The larger the value of $\omega$, the higher the frequency of the sinusoid. The larger the value of k, the greater the degree of damping.

FIG. 1 illustrates four examples of damped sinusoids graphs. The top two examples 10, 12 are sinusoids having a radian frequency ($\omega$) equal to $\omega_1$. The bottom two examples 14, 16 are sinusoids having $\omega$ equal to $\omega_2$, where $\omega_1$ is less than $\omega_2$. Sinusoids 10, 14 have a damping factor (k) equal to $k_1$. The other two examples 12, 16 have k=$k_2$, where $k_1$ is less than $k_2$.

For events occurring in rotating machines, the corresponding vibration signatures can be modeled by damped sinusoids. A damped sinusoid may be represented by a radian frequency ($\omega$) and a damping factor ($\zeta$). In one embodiment, the parameters of a damped sinusoid relating to $\omega$ and $\zeta$ are found by executing the steps of the flow-chart shown in FIG. 2.

Figure 2:
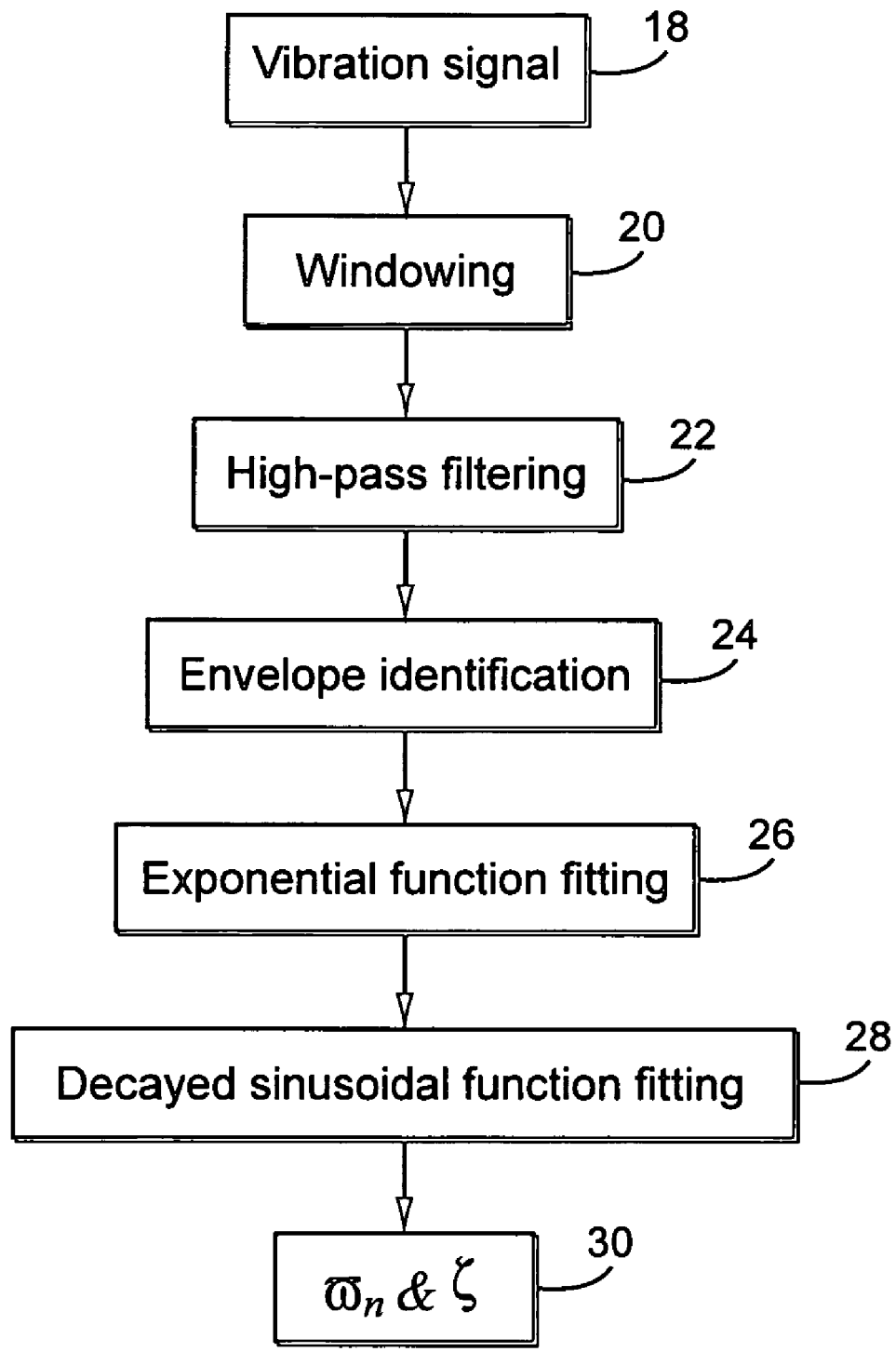
FIG. 2 is a flow chart of steps for fitting a vibration signature to a damped sinusoid.

FIG. 2 shows a sequence of steps to identify (window), filter and model a particular vibration event as a damped sinusoid. In step 18, a vibration signal is acquired from a vibration sensor monitoring a rotating machine. The vibration signal may be a continuous signal, a series of periodic signals or a signal(s) taken over a selected period(s). In step 20, a vibration signal event of interest is identified and isolated by, for example, bracketing the signal in time. The window has a duration that corresponds to the event. The identification of the event may be performed manually or automatically, such as by a software module that identifies and isolates particular signals in windows.

In step 22, the vibration event signal is passed through a high-pass filter, e.g., one that passes frequencies above 6-10 kHz, to remove low-frequency noise. The signal envelope is computed in step 24. In step 26, an exponential is used to approximate the computed envelope. The exponential approximation yields a decay factor ($\beta$). The characteristic damped sinusoid for a vibration signal is the function whose parameters are obtained as specified in FIG. 3. The decay factor of the exponential approximation can be used to compute the damping factor of the characteristic damped sinusoid. In step 28 of FIG. 2, the characteristic damped sinusoid is computed for the vibration signal. This yields the radian natural frequency ($\omega_n$) and the damping factor ($\zeta$), in step 30.

FIG. 3 shows in greater detail the mathematical steps for deriving an exponential function that models the decay of an isolated vibration signal and for fitting a damped sinusoid function to the signal. An ARGMIN function may be used to fit the exponential approximation to the vibration signal by iteratively determining the difference between a value ($f_i$) of the vibration data envelope and a value of the exponential approximation having a particular decay factor ($\beta$) and constant ($\alpha$), and summing these differences for several points (n) in time. A best-fit exponential approximation is determined by finding the decay factor and constant that results in the smallest sum of squared differences of values between the approximation and actual vibration signal.

Figure 4:
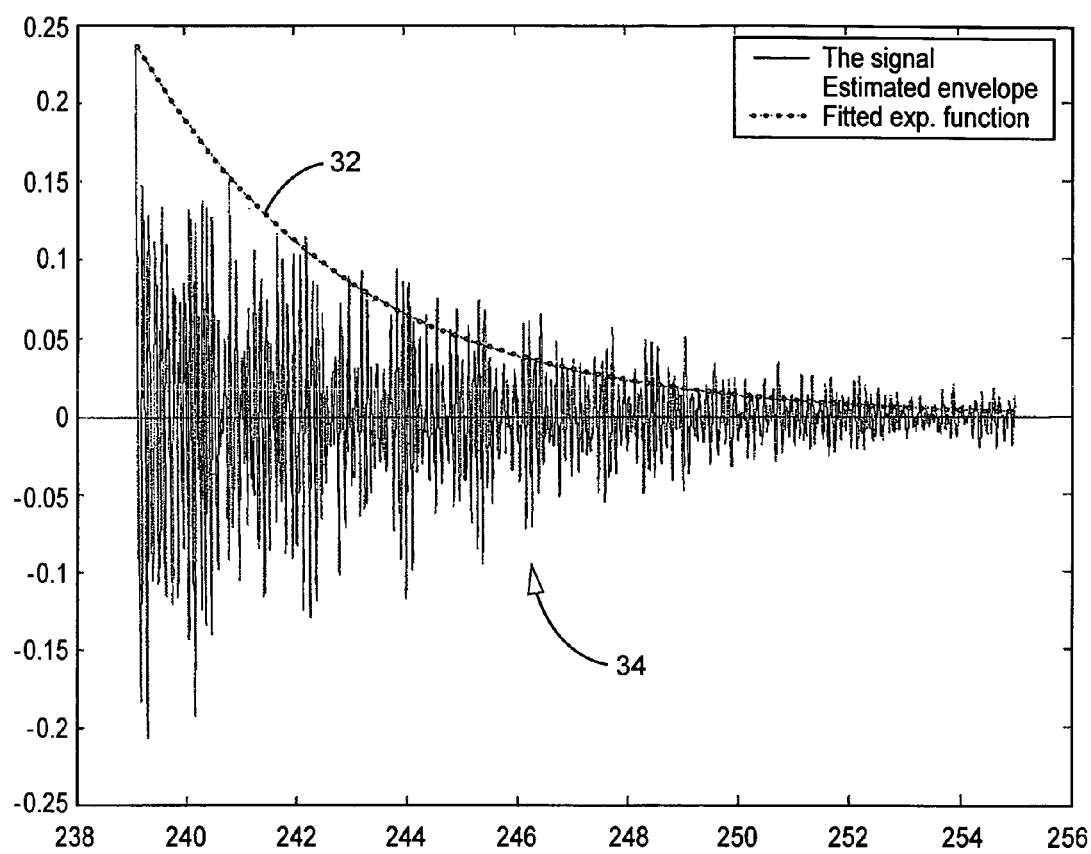
FIG. 4 are exemplary charts of vibration data and identified vibration events that correspond to a signature event.

FIG. 4 shows an exemplary exponential approximation 32 that has been fitted to a decaying vibration signal 34. The exponential approximation 32 approximates the envelope of the signal 34. The envelope of the vibration data is defined by the signal peaks of the vibration data within the envelope. The decay factor can be derived from the exponential approximation that best fits the envelope for the vibration signal. This decay factor is partially used to determine the characteristic damped sinusoid function.

The characteristic sinusoid function is determined by finding a damped sinusoid function that best correlates ("corr." as shown in FIG. 3) to the isolated vibration event signal. The ARGMAX operation iteratively correlates damped sinusoid functions having various natural frequencies ($\omega_n$) to the filtered vibration data. The ARGMAX operation identifies the natural frequency ($\omega_n$) that best matches the frequency of acquired vibration signal. The other parameters are the damped frequency ($\omega_d$) and damping factor ($\zeta$), both of which can be determined from the natural frequency ($\omega_n$). The $\omega_n$ and $\zeta$ parameters completely define a characteristic damped sinusoid function that models a particular vibration event.

A characteristic damped sinusoid may be fitted to a vibration event using other techniques. For example, the parameters ($\omega_n$ and $\zeta$) of a characteristic damped sinusoid may be found using a simultaneous solution using a maximum likelihood technique. A short-term Fourier transform can also be used to help determine the natural frequency of a vibration event signal. For example, only the natural frequency of the vibration signal event may be extracted using a Short-term Fourier Transform. The natural frequency of the damped sinusoid may be damped with a constant damping factor set for example 0.05. In another example, both a combination of the frequency and the damping factor may be used to set the parameters of the damped sinusoid.

The characteristic damped sinusoid may be used to identify the occurrence of the vibration event in other vibration signals and to determine the time of occurrence of the event with respect to the device rotation. To use a characteristic damped sinusoid to identify a recurring vibration event of interest during continuous monitoring of a machine, the vibration event of interest is first identified and characterized (see FIGS. 2 and 3). The characteristic damped sinusoid corresponding to that event of interest is used to identify and localize the occurrence of the vibration event(s) of interest in the monitored signal.

Detecting the occurrence of a vibration event as well as its time of occurrence with respect to the device rotation is helpful for prognostic and diagnostic analysis of a rotating machine. For example, the characteristic damped sinusoid may be used to identify a shift in the vibration signature of a recurring vibration event or a shift in the timing of a recurring vibration event. Such shifts in the timing of an event may indicate an incipient fault in a rotating machine. Further, the precise timing of a vibration event in a rotating machine may be matched with the rotational position of the machine to identify where the event occurs in the machine rotation cycle.

There are various ways in which a characteristic damped sinusoid pertaining to a vibration event may be used to localize the event(s). In one embodiment, the characteristic damped sinusoid can be embodied in a kernel, in a manner similar to the kernel described in the related commonly-owned, pending US Patent Application entitled "Self-Referenced Condition Monitor", U.S. Pat. Ser. No. 10/906,052 filed Feb. 1, 2005, (GE Docket RD 33166), the entirety of which is incorporated by reference.

In another embodiment, the characteristic damped sinusoid may be used as a mother wavelet in a standard wavelet analysis, where the continuous waveform transform (CWT) coefficients are computed and viewed at a scale corresponding to a center frequency (e.g., 14.2 kHz) of the characteristic damped sinusoid for the vibration signal corresponding to the event of interest. It is expected that the CWT coefficients will be dominant in the temporal vicinity of the occurrence of the event of interest. In one embodiment, the X-axis value where the maximum CWT coefficient occurs is identified as the time of occurrence of the event. Wavelet analysis is a well-known technique in signal processing.

In one example, wavelet analyses were conducted using the characteristic damped sinusoid was as well as a db9 wavelet. Both signal processing regimes were run on data from a sequential rotating machine cycle to determine whether the vibration event would be recognized and localized by using the corresponding CWT coefficients.

Figure 5:
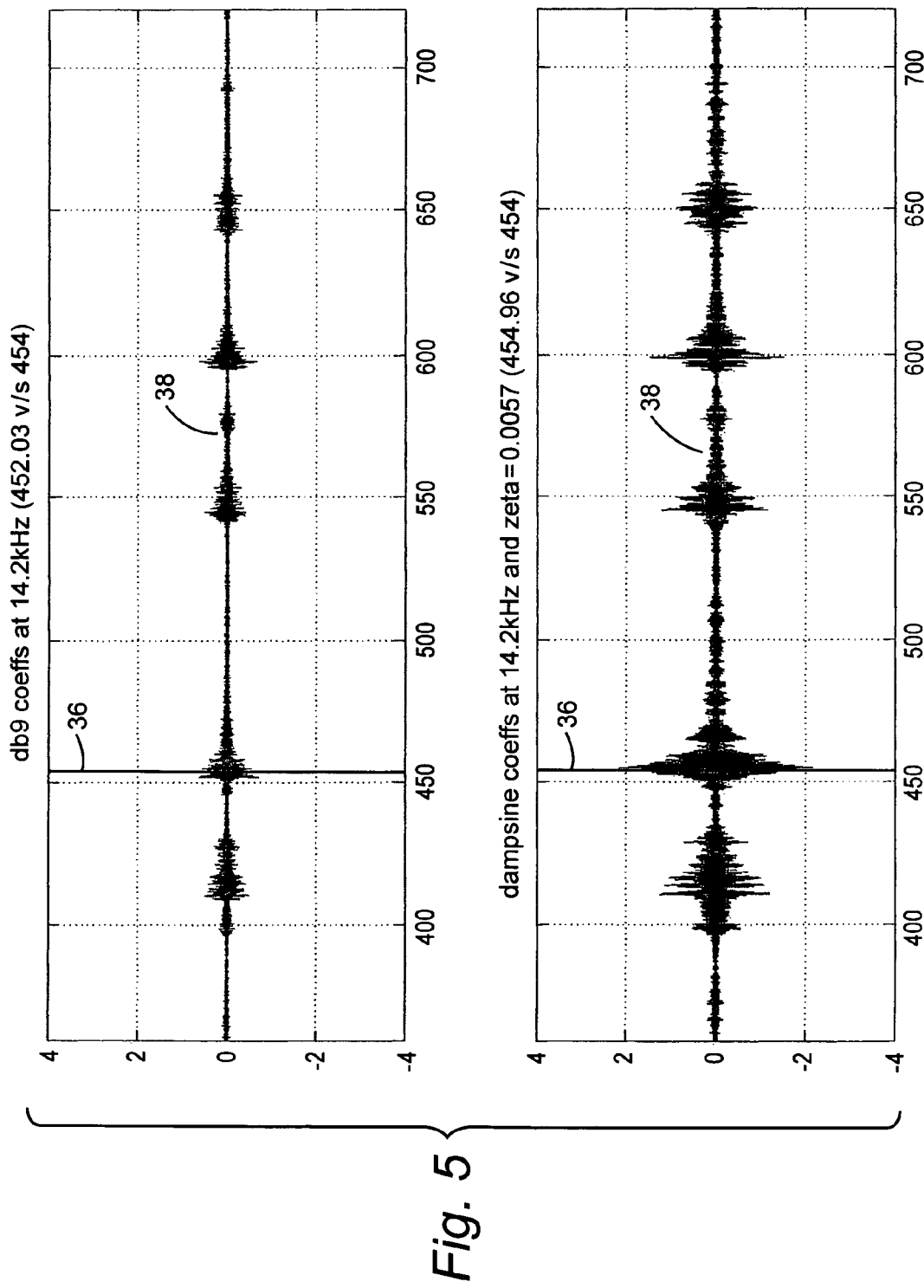
FIGS. 5 and 6 are exemplary charts of vibration data and identified vibration events that correspond to a signature event.

The results disclosed in FIG. 5 are respectively from analyses based on using the db9 and the characteristic damped sinusoid as the mother wavelets. They were tested on a signal different from the signal used to extract the parameters for the characteristic sinusoid. The time of occurrence of the event of interest that is being detected in the experiment was already known, by other means, i.e. as "ground truth," to occur at an X-axis value equal to 455, as shown by the solid line 36 in the plots 38 showing the coefficients for each analysis.

The two data plots 38 in FIG. 5 are prepared to the same scales in time (horizontal axis) and amplitude (vertical axis). The damped sinusoid recognizes (see solid line 36 in FIG. 5) and locates the reoccurrence of the event on which it was trained more accurately and provides significant differentiation in recognition and location efficacy with respect to the db9 processing.

Figure 6:
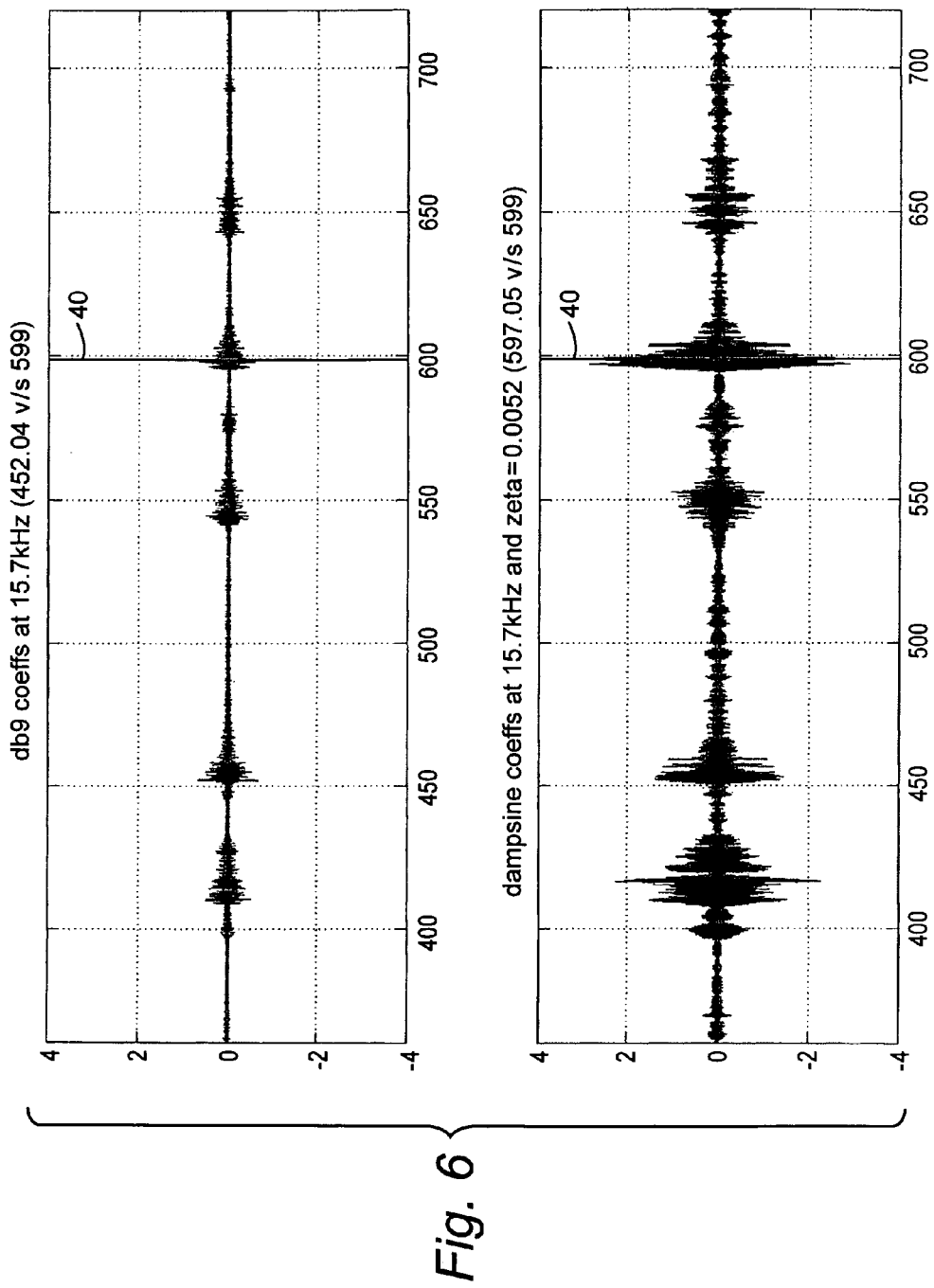

FIG. 6 shows another exemplary experiment that was conducted for a separate vibration event of interest, which is known (as ground truth) to occur at an X-axis value equal to 599. Again, specific to the event of interest, the parameters of the characteristic damped sinusoid model were based on vibration signals other than shown in FIG. 6. The effectiveness of the model-based mother wavelet (see FIG. 6) is more pronounced here when compared to the 'db9' wavelet (see FIG. 5) since the point of detection 40 (based on the maximum coefficient value) is superior for the damped sinusoid wavelet (at time=597.05). The 'db9' wavelet seems to correlate more strongly with an event different from the current event of interest (at time 452.04), thereby missing detection of the event of interest.

Figure 7:
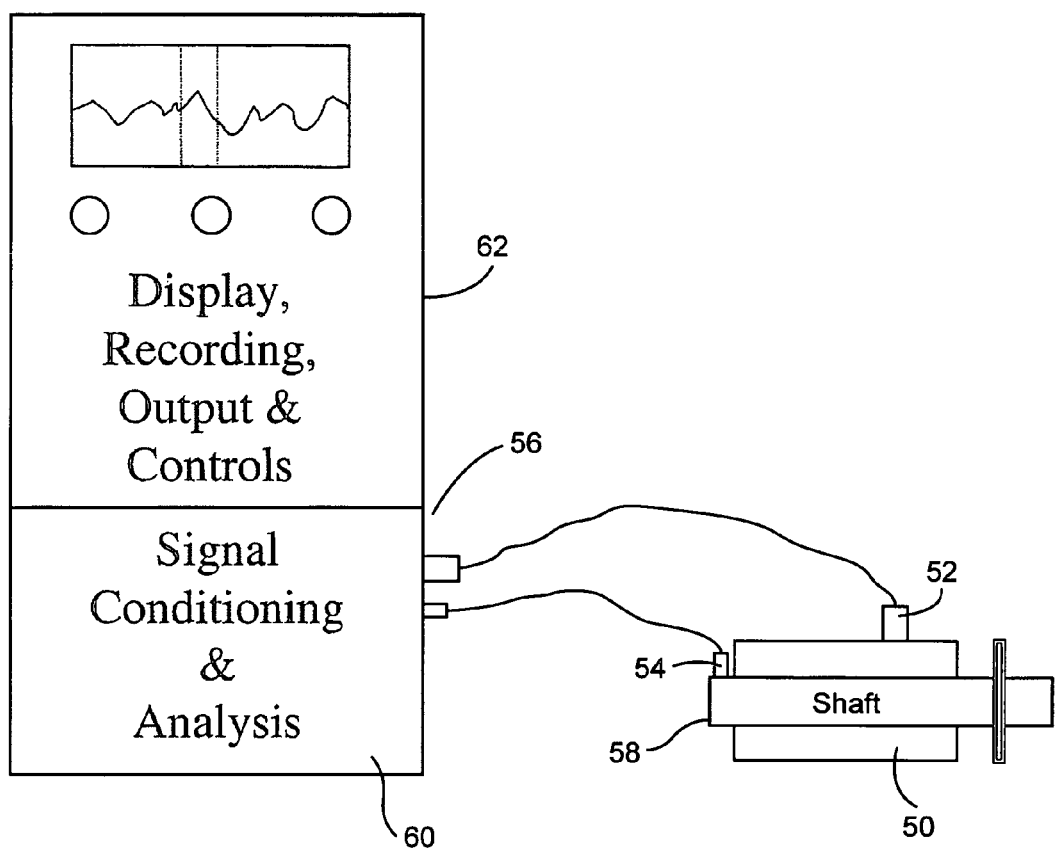
FIG. 7 is a vibration analysis system monitoring a rotating machine.

The method of using the characteristic damped sinusoid may be incorporated into a system for signal monitoring and diagnosis. FIG. 7 is an illustration of the components of such a system. FIG. 7 is a schematic diagram of a rotating device and vibration monitoring equipment. The monitored equipment 50, e.g., rotating machine, is shown with an attached vibration transducer 52. There may also be a shaft encoder 54 attached and connected to the physics-based signal analyzer (PBSA) system station 56. The shaft encoder provides the angular position of the shaft 58 so that shaft angular position may be correlated to the signal from the vibration transducer.

The PBSA system station may be a module that the operator uses to continually monitor those vibration events. The system station includes an electronic and computer system 60 to capture, condition and analyze vibration signals, such as by capturing signals, isolating vibration events, determining the parameters for characteristic damped sinusoids and matching the parameters to a vibration signal. The PBSA system also includes a display, recorder, output and control device 62. The monitor displays the results of the damped sinusoid wavelet analysis. This PBSA sub-system 62 may have exceedance alarms and logging and statistical capability.

In the PBSA, the signal conditioning and analysis unit may generate the characteristic damped sinusoid for the vibration signal corresponding to an event of interest. This sinusoid can be later used to identify the recurrence of the event of interest in the vibration signal. The display and control unit generates a display image showing the identified vibration events. A shaft encoder may also generate a rotational signal indicative of a rotational position of a rotating shaft in the machine. The PBSA correlates the rotational signal and the identified vibration events, and displays the correlation between the vibration events and shaft angular position on the display image. Further, a control input to the display and control unit of the PBSA may receive user inputs identifying a signature vibration event to be modeled by the characteristic damped sinusoid.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for analyzing a vibration event comprising:
acquiring a vibration signal;
isolating a vibration signal event in the acquired signal;
determining a natural frequency of the vibration signal event;
using a damped sinusoid corresponding to the natural frequency to characterize the vibration signal event, and
using the characteristic damped sinusoid to identify an occurrence of the vibration signal event in another vibration signal subsequent to the isolated vibration signal event.

2. The method of claim 1 wherein determining the frequency of the characteristic damped sinusoid includes identifying a natural frequency of the vibration signal event using a short-term Fourier Transform.

3. The method of claim 1 further comprising determining a damping factor for the characteristic damped sinusoid.

4. The method of claim 3 further comprising fitting an exponential function to the vibration signal event to determine the damping factor for the characteristic damped sinusoid.

5. The method of claim 1 wherein applying the characteristic damped sinusoid further comprises detecting a shift in a time of the occurrence of the vibration signal event.

6. The method of claim 1 wherein using the characteristic damped sinusoid to identify an occurrence of the vibration signal event includes a wavelet analysis.

7. The method of claim 6 wherein the wavelet analysis includes applying the characteristic damped sinusoid as a mother wavelet.

8. A method for analyzing a vibration event comprising:
acquiring a vibration signal;
isolating a vibration signal event in the acquired signal;
determining a natural frequency of the vibration signal event, using a damped sinusoid corresponding to the natural frequency to characterize the vibration signal event;
using the characteristic damped sinusoid to identify an occurrence of the vibration signal event in another vibration signal
determining a damping factor for the characteristic damped sinusoid;
fitting an exponential function to the vibration signal event to determine the damping factor for the characteristic damped sinusoid, wherein fitting the exponential function further comprises comparing exponential functions having various decay factors to a signal envelope of the vibration signal event and selecting one of the decay factors to determine the damping factor.

9. The method of claim 8 wherein comparing exponential functions further comprises determining a sum of squared differences between values of the exponential function at each of several decay factors and corresponding values of the signal envelope, identifying the decay factor corresponding to a smallest sum of the squared differences, and using the identified decay factor to determine the damping factor.

10. A method for modeling a vibration event comprising:
acquiring a vibration signal generated by a rotating machine;
isolating a vibration signal event in the acquired signal;
determining a natural frequency of the vibration signal event using a short-term Fourier Transform;
using a damped sinusoid corresponding to the natural frequency to characterize the vibration signal event, and
using the characteristic damped sinusoid to identify an occurrence of the vibration signal event in another vibration signal subsequent to the isolated vibration signal event.

11. The method of claim 10 further comprises reporting the occurrence of the vibration signal event in another vibration signal.

12. The method of claim 11 wherein the report of the vibration signal event is applied to schedule maintenance of the rotating machine.

13. The method of claim 10 wherein applying the sinusoid further comprises detecting a shift in a time of the occurrence of the vibration signal event.

14. The method of claim 10 further comprising determining a damping factor for the characteristic damped sinusoid by fitting an exponential function to the vibration signal event.

15. The method of claim 10 wherein determining the frequency of the damped sinusoid includes identifying a natural frequency of the vibration signal event using a short-term Fourier Transform.

16. The method of claim 10 wherein using the characteristic damped sinusoid to identify an occurrence of the vibration signal event includes a wavelet analysis.

17. The method of claim 16 wherein the wavelet analysis includes applying the characteristic damped sinusoid as a mother wavelet.

18. A method for modeling a vibration event comprising:
acquiring a vibration signal generated by a rotating machine;
isolating a vibration signal event in the acquired signal;
determining a natural frequency of the vibration signal event using a short-term Fourier Transform, using a damped sinusoid corresponding to the natural frequency to characterize the vibration signal event;
using the characteristic damped sinusoid to identify an occurrence of the vibration signal event in another vibration signal, and
determining a damping factor for the characteristic damped sinusoid by fitting an exponential function to the vibration signal event, wherein fitting the exponential function further comprises determining a sum of squared differences between values of the exponential function at each of several decay factors and corresponding values of the signal envelope, identifying the decay factor corresponding to a smallest sum of the squared differences, and using the identified decay factor to determine the damping factor.

19. A system for monitoring a rotating machine comprising:
a vibration sensor coupled to the machine, said vibration sensor producing a signal;
a characteristic damped sinusoid representative of a known vibration event, and
a physics based signal analyzer (PBSA) further comprising a signal conditioning and analysis unit and a display and control unit, wherein the signal conditioning and analysis unit applies the characteristic damped sinusoid to the signal and identifies vibration events in the signal corresponding to the sinusoid, and wherein the display and control unit generates a display image showing the identified vibration events.

20. A system for monitoring a rotating machine comprising:
   a vibration sensor coupled to the machine, said vibration sensor producing a signal;
   a physics based signal analyzer (PBSA) further comprising a signal conditioning and analysis unit and a display and control unit, wherein the signal conditioning and analysis unit generates a characteristic damped sinusoid applied to the signal and identifies vibration events in the signal corresponding to the sinusoid, and wherein the display and control unit generates a display image showing the identified vibration events, and
   a shaft encoder generating a rotational signal indicative of a rotational position of a rotating shaft in the machine and wherein said PBSA correlates the rotational signal and the identified vibration events and displays the correlation between the vibration events and shaft angular position on the display image.

21. The system in claim 20 further comprising a control input to the display and control unit to receive user inputs identifying a signature vibration event to be modeled by the characteristic decayed sinusoid.

* * * * *